March 9, 1926.
W. R. B. WHITTIER
CORD TIRE
Filed Nov. 8, 1919
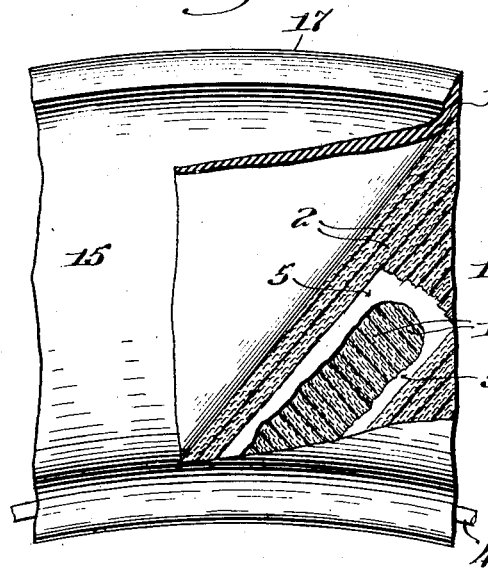
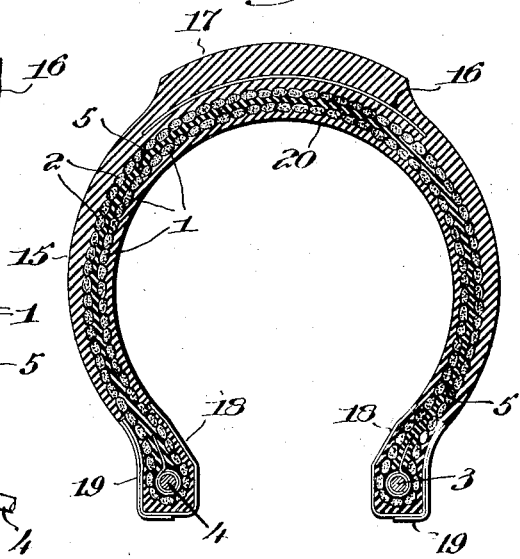
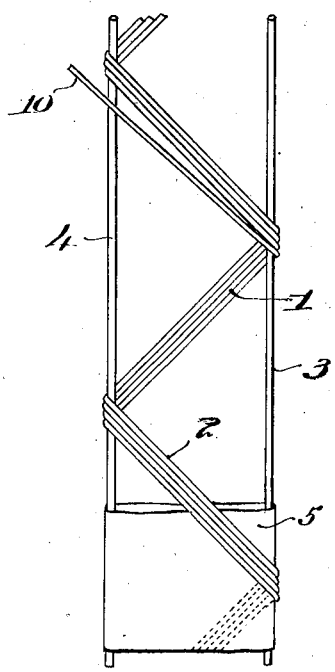
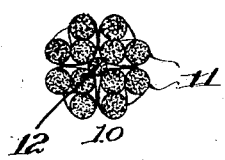
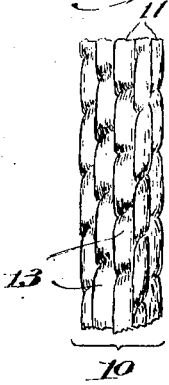

Patented Mar. 9, 1926.

1,575,955

UNITED STATES PATENT OFFICE.

WALTER R. B. WHITTIER, OF CHATTAHOOCHEE, GEORGIA.

CORD TIRE.

Application filed November 8, 1919. Serial No. 336,590.

*To all whom it may concern:*

Be it known that I, WALTER R. B. WHITTIER, a citizen of the United States of America, and resident of Chattahoochee, in the county of Fulton and State of Georgia, have invented new and useful Improvements in Cord Tires, of which the following is a specification.

This invention relates to vehicle tires of the cord type comprising a shoe, usually serving as the outer cover for a pneumatically extended inner tube, having in its construction a carcass or body of textile elements.

As heretofore constructed such carcasses have been applied about formers, or wound between cord or wire annuluses establishing a bead or edge, or otherwise applied to constitute inner reinforcing layers providing tensile strength to the shoe or cover in every direction. In the best practice of which I am aware in the prior art the cords of which the carcasses are composed have been laid or twisted cords or small ropes, usually comprised of three strands of cotton yarn, strands having a left-hand twist typically being laid in a right-hand twisted relation, or vice versa, so as to provide a rope the fibers of whose surface lie roughly longitudinally where they are exposed at the surface of the twisted cord or rope.

Tires having carcasses made of any such cords or ropes are a marked improvement over the prior practice of reinforcing tires by woven fabrics or by wires or by various other expedients, tires having the cord reinforcement uniformly showing greater longevity and greater reliability under excessively hard use as compared with the old structures. Such tires are, however, not without grave defects, which I have discovered to be attributable to the characteristics of the cord employed as an element of the carcass and its relation to its surroundings. Such a tire carcass, for instance, has heretofore been formed by winding upon like wire annuluses of a size adapted to serve as a core of the bead or clencher-rib edge of the tire, by first covering two coaxial parallel spaced annuluses with a sheet of unvulcanized rubber, and then winding a series of cords at an angle of 45° to the peripheral direction, first above or outside of the annuluses and then within and through the annuluses, this practice being carried out either by first sticking together a belt of parallel cords with rubber and then winding the belt in the described path; or by winding the cords singly in contacting runs until the entire outer and inner wrap around the bead annuluses is finished, and then applying plastic or liquid rubber. This produces a carcass fabric, at this stage cylindrical, having selvages of returning bights lying side by side in contact at each edge wire, the inner and outer layers being separated by the bead wires and the included layer of rubber.

I find that when the laid rope or cord of the prior art is employed, there is a marked tendency for such cord or rope to spread open into its component intertwisted yarns or strands at the sharp turns under tension taken about the wire annuluses, both during making and during subsequent use, so that the bends are spread wider than the normal diameter of the rope, and reduced in thickness to the thickness of the rope yarns or strands, and that these yarns or strands are often flattened at the bends by the strain. Where the carcass should be strongest, at the bead, it is thus made weakest by the separation of the components of the laid or twisted cord. Such a laid cord or rope is moreover easily separated or penetrated by a sharp object. Although such a twisted or laid cord or rope when free is adapted to stretch longitudinally and resiliently recover its original length on release, it loses this property when confined, the stretch and resilience being due to rotation of the intertwined cords comprising the rope upon the longitudinal axis of the rope, thus to permit each element of the rope to approach alignment with its length, the resilient recovery being due to the set bent or spiral condition of each strand tending to recover from straightness to its original spiral form. When the rope is embedded in a plastic, as in its position in the finished shoe, it can not rotate, nor can its strands straighten to stretch or resume their crinkle to recover to the original length, without breaking each its attachment to its embedment in the shoe. The tendency to untwist under longitudinal strain is resisted only by the plastic embedment, and is productive of heating and destructive of the cohesiveness of the fabric, wear either breaking the attachment to the rubber, or parting internally the fibres of the strands.

Embedment of the cord and attachment to its neighbors is essential to the prevention of internal friction in use and to maintenance of consistent and uniform tensile strength in the fabric. When, as stated, each cord or rope tends to rotate in response to a force tending to extend it longitudinally, this embedment and cohesion is rapidly destroyed, with accompanying heat tending to destroy the rubber of the portions of the shoe affected.

When plastic or liquid rubber is applied to the twisted or laid rope, that portion of the rubber which penetrates the convolutions of the twisted strands is particularly subject to heating and destruction by the repeated internal untwisting motions of the cord or rope. Penetration into the interior of the cord or rope is not uniform, and the interior portion of the rope is at places left free to move in respect to the exterior portion, and thus in use to subject each strand to the internal friction of fibre rubbing on fibre.

Twisted or laid ropes are notoriously variable in tensile strength from place to place in the same length, and as an article of commerce such tire cord, as a necessity of the mode of manufacture, is variable in weight and diameter.

As a further necessity of the mode of manufacture, it is impracticable to supply great lengths of rope free from joints or splices of inferior strength and differing in diameter from the standard size. Since each tire carcass requires for honest consistency a continuous length free from splices, loss of long ends of twisted or laid ropes, because insufficient for a whole carcass, is frequent and is implicit in the use of such ropes.

This invention provides means in avoidance of the above difficulties. A principal object is to provide a cord tire in which the resilience and life of both the cord and the rubber or other plastic body of the tire is maintained and increased; to provide for standardization of the tensile strength, thickness, weight and durability of the cord fabric to a degree heretofore impossible; to provide a cord tire fabric free from internal friction and heating to a degree heretofore not attained, to prevent losses of material in manufacture and thereby to reduce the cost of such tires, and to provide such tires with greatly increased resistance to cutting and puncture.

In the accompanying drawings, in which a tire comprising one embodiment only of the invention is shown by way of illustration of the new genus of tires constituting the invention;

Fig. 1 is a side elevation of a section of tire shoe torn open to display the various components of the fabric;

Fig. 2 is a cross section on a radial plane of the shoe shown in Fig. 1;

Fig. 3 is a diagram illustrating a preferred arrangement of cords;

Fig. 4 is a section of a typical cord; and

Fig. 5 is a side elevation of the cord shown in Fig. 4.

Referring to Figs. 1, 2 and 3, the cord layers 1 and 2 may be disposed in any desired way to obtain the desired reinforcement of the fabric, for instance, as shown in Fig. 3, by winding under and over diagonally, as at 45° to the parallel spaced endless bead annuluses 3 and 4 a single cord 10, the annuluses having been provided with a suitable separator sheet of plastic rubber 5 before the winding begins. The winding is continued until the entire inner and outer surface of the cylinder defined by the spaced annuluses is covered with cords contacting, or substantially contacting, in each diagonal layer.

In order to avoid the difficulties mentioned above, a cord element typified by a cord 10 is employed, this cord preferably having nearly uniform breaking strength, with a permitted variation of about five per cent from standard (which may be as high as 250 pounds), having a substantially uniform maximum elongation under given tensile strain, having a diameter nowhere varying by more than ten per cent (preferably by not more than seven per cent) from the normal diameter, and having throughout the tire no splice or joint involving at any one place in the cord more than ten per cent of its component strands.

These qualities are provided by a cord 10, as illustrated in Figs. 4 and 5, of the solid-braided type, which may consist of a plurality of preferably like longitudinal strands 11, joined together in a braiding relation familiar to makers of solid braided cordage; such for instance as will result from the continuous braiding of twelve strands 11 in four groups by carriers actuated to pass one strand (active) under two strands (passive) and then to repeat the operation with one of the passive strands as the active strand, and so on. If desired a braid so formed may be built upon and about a core cord 12 which may, as shown in Fig. 4, be of smaller diameter than the strands 11. Such cordage is made in continuous lengths of any desired magnitude, each component strand being separately spliced when broken or exhausted, such separated splices having no substantial effect upon longitudinal tensile strength, diameter or elasticity of the finished cord.

Any desired textile material may be employed for the strands 11, but a suitable and preferred material for the strands is a twisted or untwisted bundle of the desired number of even and well-spun cotton yarns made of a good quality of combed or carded cotton. In the instance shown and preferred for passenger cars of ordinary sizes, the cylindrical braided cord is of about 3/16 inch diameter, and the thirteen strands comprising it are each parallel bundles of twelve or more yarns, about 20's, of the sort mentioned.

A consequence of the cord structure mentioned is a slightly-roughened nearly cylindrical exterior built up of longitudinally extending exposed crossings 13, Fig. 5, of each strand in succession (except the core strand) the entire body of the cord being filled with the inner runs of the strands passing to the interior under the other strands. Such braided cordage has the required qualities; upon longitudinal stress there is no tendency of the cord to rotate; in such cordage each element of the complex of longitudinal threads forming the cord is under substantially equal strain and bears its full part without having to shift position in the cord in determining the maximum decrease in diameter, maximum elongation, and tensile strength under endwise strain. Such a cord, although having a low elongation, is highly elastic within the limits of its elongation, this elasticity being due to the internal compression in a diametrical sense of the cord itself. Every part of the cord resists lateral separation by puncture or bending. It has been determined by experiment that the normal elasticity of such a cord is as great as the expected working elasticity of the tire fabric as a whole.

Before the cord 10 is wound on the annuluses 3, 4, or otherwise built up into the cord fabric mentioned, it is treated at any desired or customary way adapted to its situation; a recommended treatment is to subject the cord to impregnation or mere coating with a liquid or semi-liquid vulcanizable rubber solution of any of the well known compositions employed for treatment of tire elements.

As compared with the rope cord heretofore used the cord itself takes up a relatively small amount of impregnating or coating agent, but this is not because there is an inferior penetration of the impregnating agent but because the cylinder defined by the cord is more thoroughly occupied with useful fibre than in the case of a twisted or laid cordage.

The structure above mentioned, which may be varied if desired so long as the solid braided characteristic is retained, is thus susceptible of its maximum elongation and elastic return without separating the fibres among themselves, rubbing one strand over the other, or twisting one strand in respect to the other, elongation merely causing each strand to straighten by compression of the underlying strands in a plane lying substantially longitudinally and diametrically of and within the cord. Although penetrated by rubber subsequently vulcanized, elongation and elastic recovery are not greatly affected by the rubber. The fibres of the fabric are, however, thereby waterproofed and rendered more cohesive; the breaking strain of the treated cord is greater than the breaking strain of an untreated cord. Durability is also increased.

The annuluses 3 and 4 having been wound full, and the wound end of the cord fastened off in any usual manner, as on the inner surface of the carcass, the tire is finished by any usual method. For instance, the fabric is stretched on its peripheral median line into the horseshoe cross section indicated in Fig. 2, with the aid of a suitable former or formers, before or after the inner surface is covered with a rubber or other suitable plastic composition 20 to the desired depth, and before or after the application to its outer surface of rubber dough to form the side walls 15; and the tire at any stage of its partly formed condition may be provided with a tread 17 reinforced with some suitable fabric 16, such as non-skid or other tread 17 molded upon the tire. The outer surfaces of the beads may as usual be covered with fabric reinforces 18 and 19, and the tire as a whole subjected to any usual or desired vulcanizing or curing treatment.

The valuable functions mentioned are obtained when the cord 10 is a solid braided cord of the above described type, but it will be understood that the invention is independent of the particular structure of the cord 10 so long as this cord is capable of performing the new functions in the way described, and that the cord 10 may be of any structure adapted to be put under tensile strain without tendency to rotate in or break away from its seat; or destructively to rub one strand upon another strand; or to separate into its component strands; or to flatten, separate or lose its round character when subjected to strain at a bend about a hard abutment, as at one of the bead-wires or cords 3, 4; or to resist separation by penetration of a sharp pointed object. Other patterns of solid braids, circular woven, knit, or wrapped cordage, and other cords and ropes known to cord and rope makers have some of these characteristics, and may be employed within the invention in the new relation and for the purposes mentioned when the structure responds to the conditions explained above.

I claim:

1. A tire having therein a layer of round textile cordage characterized by a structure preventing rotative surface motion of the cord under longitudinal strain tending to break it away from adhesions or plastic attachments, and a covering mass in plastic attachment to the cordage layer.

2. A tire having therein a layer of round textile cordage characterized by an internal structure preventing rotation of the cord under longitudinal tension, and a covering substance in adhesive attachment to the cord layer.

3. A tire having therein a layer of solid braided cordage in adhesive attachment to the substance of the tire.

4. A tire having therein a layer of substantially cylindrical solid braided cordage in adhesive attachment to the substance of the tire.

5. A tire having a carcass built up of layers of parallel runs of round solid braided cordage attached together by plastic embedment.

6. A tire having a carcass built up of layers of parallel runs, lying in different directions in adjacent layers, of solid braided cords, the layers and the cords being attached together by embedment in an elastic plastic substance.

7. A tire having a carcass built up of textile cords reversed in direction to form bights about an included annulus, the cords each having a plurality of strands fastened together by other strands, whereby to resist separation of said cords into their component strands at the bights about said annulus.

8. A tire having a carcass built up of braided textile cords reversed in direction to form bights about an included annulus, the cords each having a plurality of strands interlocked together to form a solid cylindrical body by mutual interengagement of said strands, whereby said cords are inseparable into their component strands at the bights about said annulus, or by puncture.

9. In a tire casing of the type comprising two annular bead members and continuous strands of cord wound spirally about the same, that improvement which consists in the employment of solid braided cord as the material of which the cords are constituted.

10. In a tire casing of the type comprising two annular bead members and continuous strands of cord wound spirally about the same, that improvement which consists in the employment, as the cord element thereof, of solid braided cord, the stitches of which are braided together to act as hinges under flexing strains.

11. A tire casing having therein a textile inclusion built up of solid-braided cordage in adhesive contact with and embedded in the resilient substance of the tire casing, whereby the tire casing, including the cordage element, is adapted to resilient elongation without causing the cordage element to tend to rotate in respect to its embedment.

12. A tire casing having therein a textile inclusion built up of adjacent strands of round solid-braided cordage in adhesive contact with and embedded in resilient vulcanized rubber constituting the substance of the tire casing, the cordage element being adapted to stretch longitudinally without rotation in respect to its rubber embedment.

13. A tire casing having therein a textile inclusion built up of layers of adjacent parallel strands, the strands in one layer lying crosswise of another layer, said strands being of round solid-braided cordage in adhesive contact with and embedded in a resilient mass of rubber constituting the substance of the tire casing, said strands individually being adapted to be stretched to their tensile limit without rotation in respect to their embedment.

14. A shoe for pneumatic tires in which is incorporated a fabric braid laced back and forth transversely of the shoe in a bias direction with reference to the circumference of the shoe.

15. A shoe for pneumatic tires in which is incorporated a fabric braid laced back and forth transversely of the shoe to form a plurality of plies, said lacing being on the bias with reference to the circumference of the shoe.

Signed by me at Boston, Massachusetts, this fifth day of November, 1919.

WALTER R. B. WHITTIER.